UNITED STATES PATENT OFFICE.

CHRISTOPHER RIS AND CHARLES SIMON, OF BASLE, SWITZERLAND, ASSIGNORS TO JOHN R. GEIGY & CO., OF SAME PLACE.

BLACK TRISAZO DYE AND PROCESS OF MAKING SAME.

SPECIFICATION forming part of Letters Patent No. 615,497, dated December 6, 1898.

Application filed March 31, 1898. Serial No. 675,987. (Specimens.)

*To all whom it may concern:*

Be it known that we, CHRISTOPHER RIS and CHARLES SIMON, citizens of the Republic of Switzerland, residing at Basle, Switzerland, have invented certain new and useful Improvements in Processes of Producing Black Trisazo Dyestuffs, of which the following is a specification.

Our invention, for which patents have been applied for in Germany, dated November 11, 1897; in France, No. 270,151, dated September 2, 1897, and in England, dated September 3, 1897, refers to the production of a new black trisazo dyestuff, which is obtained by the combination of the tetrazo compound of paraphenylenediaminazo beta$_1$ alpha$_4$ amidonaphthol beta$_3$ sulfo-acid (gamma acid) first in acid solution with a metadiamin, such as metaphenylenediamin, and then by the further combination of the thus-formed intermediary compound with resorcin.

The new dyestuff possesses the following formula:

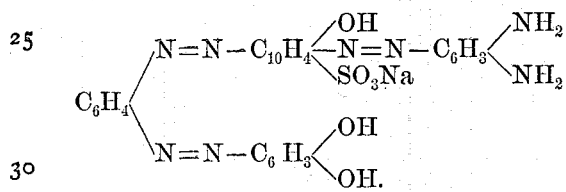

For instance, thirty-eight kilos of sodium salt of paraphenylenediaminazo beta$_1$ alpha$_4$ amidonaphthol beta$_3$ sulfo-acid are dissolved in about six hundred liters of water, then tetrazotized with forty kilos of hydrochloric acid of 21° Baumé and fourteen kilos of nitrite of sodium, and then a solution of forty kilos of acetate of sodium is added. The tetrazo compound is mixed with a solution of eleven kilos of metaphenylenediamin and the mass stirred for half an hour. The intermediary compound, which is separated in the form of a black precipitate, is allowed to run into a solution of resorcin, to which is added a quantity of carbonate of sodium sufficient to keep the mass alkaline. Then it is heated to about 80° centigrade, the coloring-matter filtered off, pressed, and dried.

The coloring-matter forms a black powder with metallic aspect. It is soluble in water with a black color, which disappears by means of reduction. The solution in concentrated sulfuric acid is of a dark blue-black color.

The coloring-matter dyes unmordanted cotton, wool, and silk in deep-black shades of great intensity.

Having thus described our invention, we claim as new and desire to secure by Letters Patent—

1. The process herein described for producing a black trisazo color, which consists in combining the tetrazo compound of paraphenylenediaminazo beta$_1$ alpha$_4$ amidonaphthol beta$_3$ sulfo-acid first in acid solution with a metadiamin and then with resorcin, substantially as set forth.

2. The new black trisazo coloring-matter possessing the following formula:

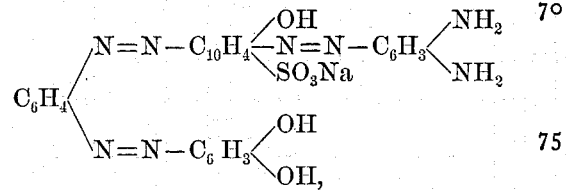

which is a black powder with metallic aspect, soluble in water with black color, forming by reducing agents a colorless solution, soluble in concentrated sulfuric acid with dark blue-black color and which dyes unmordanted cotton, wool and silk deep-black shades, substantially as set forth.

In testimony that we claim the foregoing as our invention we have signed our names in presence of two subscribing witnesses.

CHRISTOPHER RIS.
    CHARLES SIMON.

Witnesses:
 GEORGE GIFFORD,
 ALFRED NAPFLE.